(12) United States Patent
Mon (10) Patent No.: US 11,326,632 B1
(45) Date of Patent: May 10, 2022

(54) AXIALLY ALIGNED COUPLING

(71) Applicant: George Emmanuel Mon, Ladera Ranch, CA (US)

(72) Inventor: George Emmanuel Mon, Ladera Ranch, CA (US)

( * ) Notice: Subject to any disclaimer, the term of this patent is extended or adjusted under 35 U.S.C. 154(b) by 0 days.

(21) Appl. No.: 17/567,319

(22) Filed: Jan. 3, 2022

(51) Int. Cl.
*F16B 5/06* (2006.01)
*E05D 7/10* (2006.01)

(52) U.S. Cl.
CPC .......... *F16B 5/0621* (2013.01); *E05D 7/1072* (2013.01)

(58) Field of Classification Search
CPC . E05D 2005/106; E05D 7/1072; E05D 11/06; Y10T 16/557; F16B 5/0621
See application file for complete search history.

(56) References Cited

U.S. PATENT DOCUMENTS

| | | | |
|---|---|---|---|
| 7,096,536 B2* | 8/2006 | Johnson | E05D 11/1085 16/334 |
| 8,739,366 B2* | 6/2014 | Heninger | E05D 11/06 16/374 |
| 2014/0173852 A1* | 6/2014 | Heninger | E05D 7/105 16/375 |

FOREIGN PATENT DOCUMENTS

| | | | | | |
|---|---|---|---|---|---|
| EP | 0525569 A2 | * | 7/1993 | | A01G 3/0251 |
| GB | 2092220 A | * | 8/1982 | | E05D 11/081 |
| GB | 2092221 A | * | 8/1982 | | E05D 11/081 |
| WO | WO-03106116 A1 | * | 12/2003 | | B41F 21/05 |

* cited by examiner

*Primary Examiner* — Matthew R McMahon (57) ABSTRACT

A coupling with distinct portions formed as a unitary structure and a fastener placed at one end of the coupling both provided to constrain assembly components and control their relative motion linearly along and rotationally around a longitudinal center axis is presented. The coupling portions are composed of complex concave polygon or circular shapes whose normal section is determined by the manner in which the adjacent assembly components are required, alternately, to move or not move. Specific geometric constraints for the various coupling portions must be met. Various coupling embodiments may result from differing fastening elements including screw, friction fit and bonded types being attached to the coupling body piece.

7 Claims, 8 Drawing Sheets

AXIALLY ALIGNED COUPLING

FIELD OF THE INVENTION

The present invention relates to devices used to conjoin various parts of an assembly or apparatus and to how these devices control the movement of parts in relation to one another.

BACKGROUND OF THE INVENTION

Couplings are generally devices that interface with parts or other objects for the purpose of either conjoining assemblies, transmitting power or applying forces from one part to another. Conventionally, couplings can be complex, such as those that have many elements so as to perform functions as varied as joining flanged sections, gearing, allowing for angular misalignment, vibration dampening, shock reduction and hydrodynamic and magnetic transmission amongst many others. The assembly components which interface with the coupling are complex as well and have many constraints so as to properly complement the various aspects of the coupling design.

Alternately, couplings may be simple unitary or almost unitary implements whose design enables them to perform specific, more modest tasks. These types of couplings are intended to be manufactured and placed within a simple assembly as they can lack capability and strength and are limited in their manner of interfacing with the assembly.

The improvements of the present invention are in addressing the limitations of these more modest devices given the simplicity of the presented coupling. The method of joining the coupling to an assembly and providing increased movement control of the assembly components is enhanced. In particular, the ability to both conjoin and enable rotational articulation of plastic and carbon fiber components amongst others is realized without supplemental sleeves, bushings or adapters. Greater adaptability for use in a variety of applications and with larger range of manufacturing materials and methods are thus attained by the coupling assembly design.

Reference: CPC F16B 1/00 Devices for securing together, or preventing relative movement between, constructional elements or machine parts.

SUMMARY OF THE INVENTION

The coupling consists of a single unitary coupling body piece and a fastener placed at one end of the coupling piece. Various additional peripheral assembly components, which vary by implementation, are presented to demonstrate coupling function but are not themselves part of this application.

The coupling assembly has a longitudinal center axis along which portions whose section plane normal (normal hereafter understood to mean transverse at ninety degrees) to this axis is determined by the manner in which the adjacent assembly components are required to move or, alternately, not move.

The coupling body piece itself has four basic constituents: a center portion about which peripheral assembly components are to hinge or rotate, integrally connected portions to both sides of the center portion, hereafter referred to as the first and second portion, intended to prevent linear or rotational movement of peripheral assembly components, and an end cap joined to either the first or second portion. In addition, fastening elements intended to constrain all assembly parts from moving linearly along the center axis of the coupling are attached to this coupling body piece. The fastening elements can differ in form from one coupling embodiment to another according to the requirements of the particular use but all function in the same manner.

The coupling improvements are fivefold. One—enhanced strength of the assembly especially in instances of generally less resilient coupling fabrication materials such as plastics or carbon fiber. Two—elimination of the requirement for any metal sleeves or inserts in the assembly. Three—greater control in rotational movement or lack thereof of assembly components as required. Four—the ability to constrain assembly components linearly along the center axis while not hindering the rotation around the axis of those components required to rotate. Five—the ability to use cost effective manufacturing materials and methods for the coupling assembly and the provision for more flexibility in the construction of the assembly. The coupling can be placed at virtually any point in the assembly construction process.

The design of the coupling body and the specific geometric constraints given are the same for all embodiments and are described in the detailed description portion of this specification. The coupling, in all its embodiments, is presented with specific shape and proportion constraints which must be met for the assembly to function as desired.

Because the non-coupling peripheral assembly components can vary, they are not limited to specific body or proportion. Three representative assemblies are presented as Employments A, B, and C each demonstrating non limiting examples of coupling use. Only the minimum peripheral assembly features necessary for proper interface with the coupling itself are presented.

DETAILED DESCRIPTION OF THE PREFERRED EMBODIMENTS

The following detailed description and appended drawings describe and illustrate various exemplary embodiments of the invention. The description and drawings are not intended to limit the scope of the invention in any manner and the methods disclosed are representative of non-limiting applications.

Figure 1:
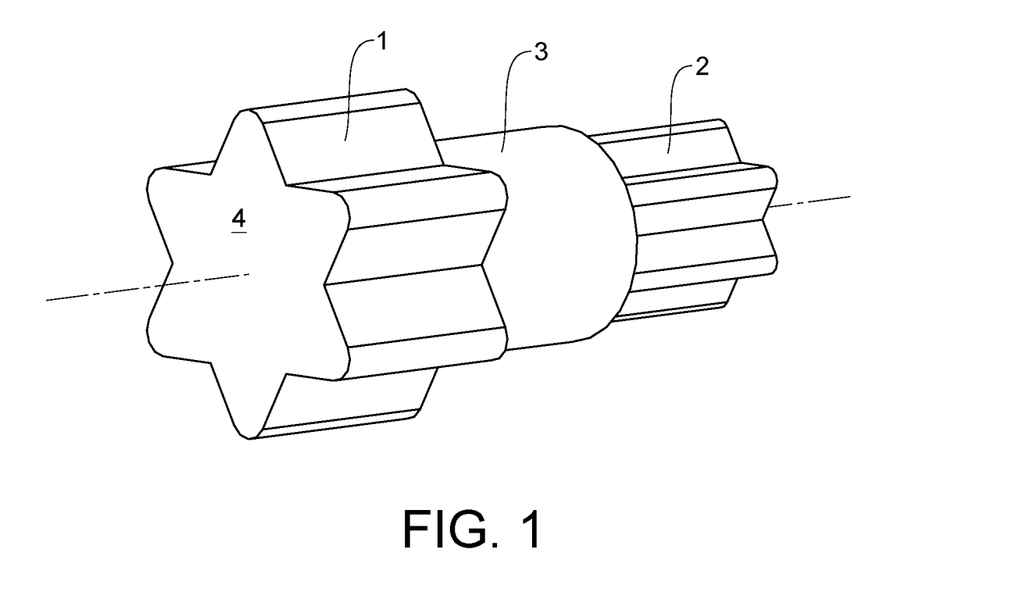
FIG. 1 is a perspective view of the coupling body without end cap or fastener.
Figure 2:
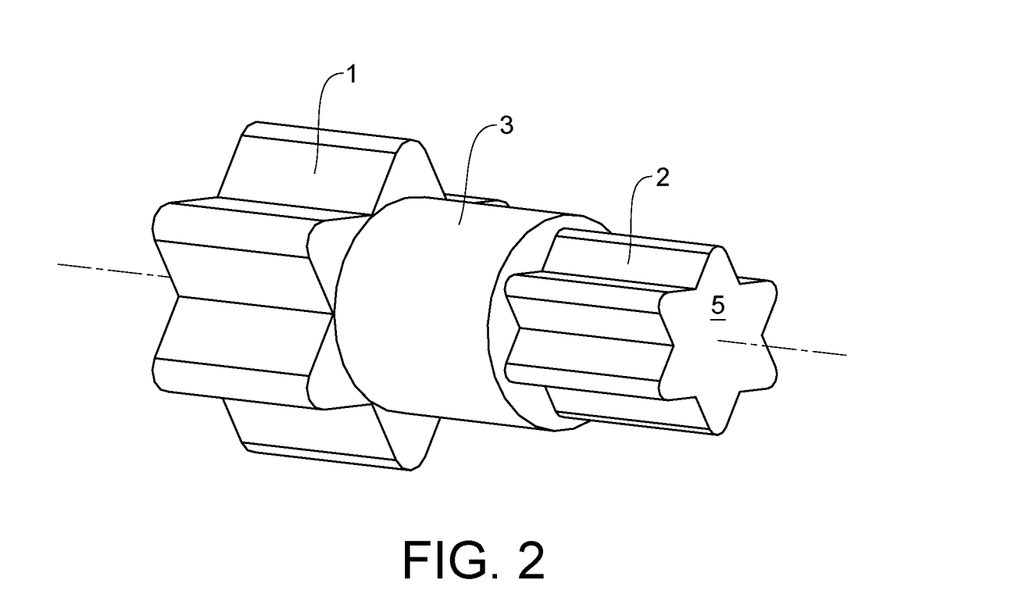
FIG. 2 is an alternate perspective view of the coupling body without end cap or fastener.
Figure 3:
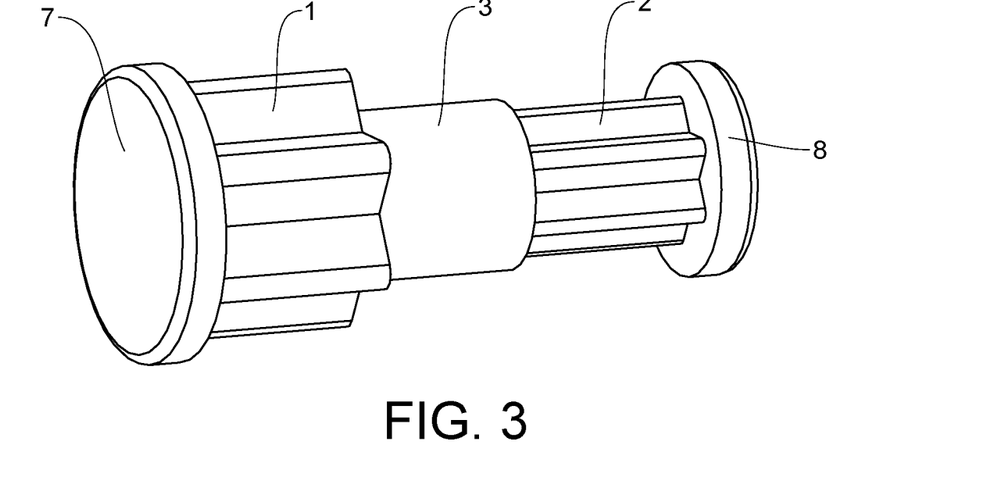
FIG. 3 is a perspective view of the coupling with integral end cap and threaded nut fastener.
Figure 4:
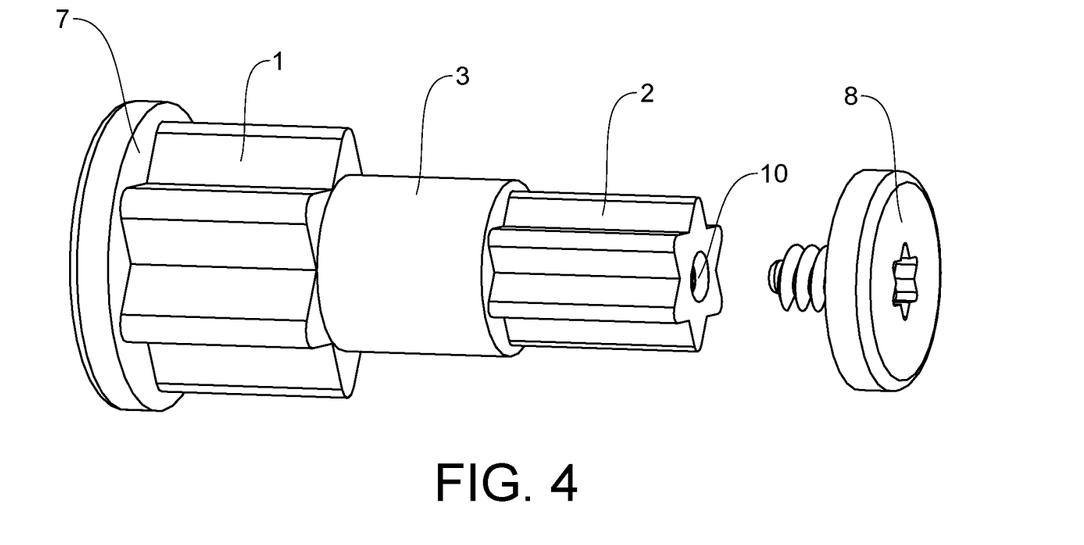
FIG. 4 is an alternate perspective view of the coupling with integral end cap and detached threaded nut fastener.
Figure 5:
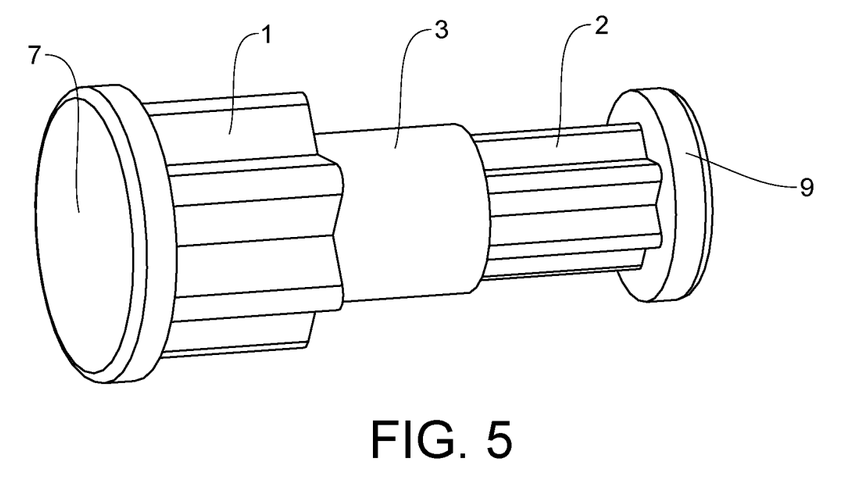
FIG. 5 is a perspective view of the coupling with integral end cap and bonded fastener.
Figure 6:
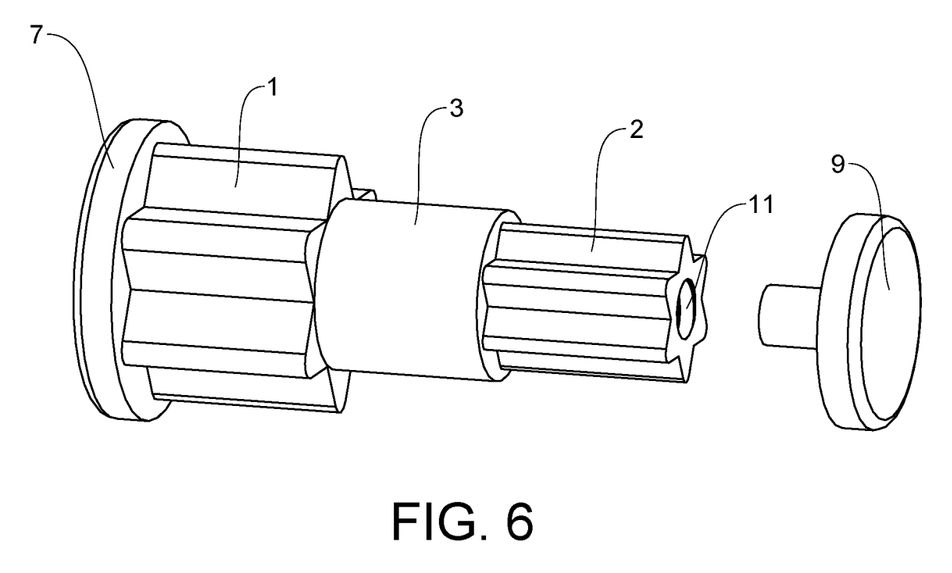
FIG. 6 is alternate perspective view of the coupling with integral end cap and detached chemically bonded fastener.

FIGS. 1 and 2 illustrate the basic portions of the coupling. FIGS. 3-8 illustrate the various embodiments of the invention in isolation from the assemblies in which they may be employed. FIGS. 9-15 present three employments of the coupling in assemblies. The non-coupling assembly components are presented solely to describe the constraints on these non-coupling assembly components and to illustrate the function of the coupling itself within an assembly.

FIGS. 1 and 2 show the primary elements of the coupling.

In all embodiments the coupling body has the following characteristics and constraints. The coupling has a longitudinal center axis (shown in FIGS. 1 and 2 only) along which portions whose normal section plane shape varies as required by their function. The first 1 and second 2 portion of the coupling are designed to have peripheral assembly components adjacent to them where no movement or rotation is desired. As such, a complex, non-circular shape for this coupling section is required. The shapes that achieve this result most effectively are generally but not exclusively complex, concave polygons. Examples of these coupling shapes are six to ten point star shapes which provide planes coming into contact with apparatus planes at twice the number of polygon points. For the center portion 3, the coupling is shaped as a cylinder so as to allow adjacent assembly components to rotate about the center coupling axis.

A more precise description of the coupling is as follows. The coupling center portion 3 is cylindrical in shape with the diameter as required by the assembly design. The first portion 1 has a shape which in section normal to the longitudinal center axis is a complex, concave polygon 4. The polygon is of a size so that it is circumscribed about a circle whose diameter is greater than or equal to the diameter of the center portion 3. The second portion 2 has a shape which in section normal to the longitudinal center axis is a complex, concave polygon 5 inscribed in a circle whose diameter is smaller than or equal to that of the diameter of the center portion 3.

The points of the complex concave polygon may optionally be filleted as shown in all embodiments of the coupling presented.

The length along the longitudinal center axis of the center, first and second portion may vary as is required by the design of the overall assembly.

These portion's shapes are matched with peripheral assembly components containing an opening whose shape is the negative of the coupling portion in section. This arrangement serves to provide forces opposing rotation of the assembly parts about the coupling axis first and second portion. These coupling shapes provide forces directly opposing the assembly components opening planes at each point minimizing slippage, disengagement or grinding type failures.

The peripheral assembly components in the center of the assembly are given a circular opening of the same approximate diameter as the coupling center section within which that coupling is placed so as to allow them to rotate.

The openings are generally the only requirement for the peripheral assembly components placed adjacent to the center, first or second portion. The openings are further described in the employment examples discussion to follow.

FIGS. 3-8 depict several embodiments of the invention. For most embodiments, a generally cylindrical end cap 7 is joined integrally to the coupling body at the proximal end of the coupling body first portion 1. The cap has a normal section plane diameter greater than a circle which circumscribes the complex, concave polygon of the first portion 1.

For most embodiments, a fastener is placed at the distal side of the second portion 2 for purposes of restraining the assembly components and coupling body. The fastener is of a generally cylindrical shape whose diameter in section is greater than the circle circumscribing the complex, concave polygon of the second portion 2. This fastener can take many forms but is typically either a threaded nut 8, a rivet which may be friction fit to the coupling body (not depicted) or a fastening element 9 bonded, chemically or otherwise, to the coupling body.

For these fastener forms, the coupling body needs to be modified with a recess to receive the fastener. The coupling body modifications alternately are either threaded recesses 10 intended to receive an externally threaded nut or cylindrically shaped recesses 11 in which any of many types of mechanical fasteners may be placed. Additionally, coupling bodies fabricated of pliable material can have a generally cylindrically shaped recess intended to receive self-tapping threaded fasteners.

Figure 7:
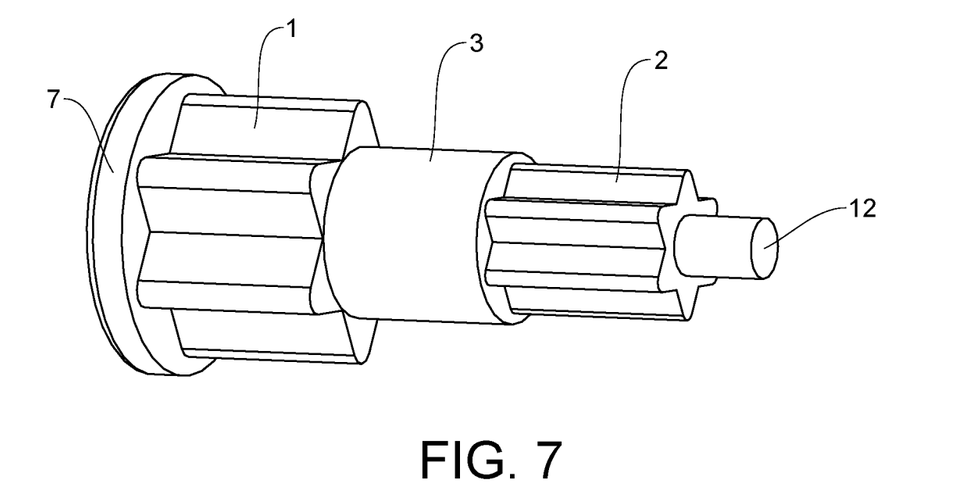
FIG. 7 is a perspective view of the coupling with integral end cap and rivet tail.
Figure 8:
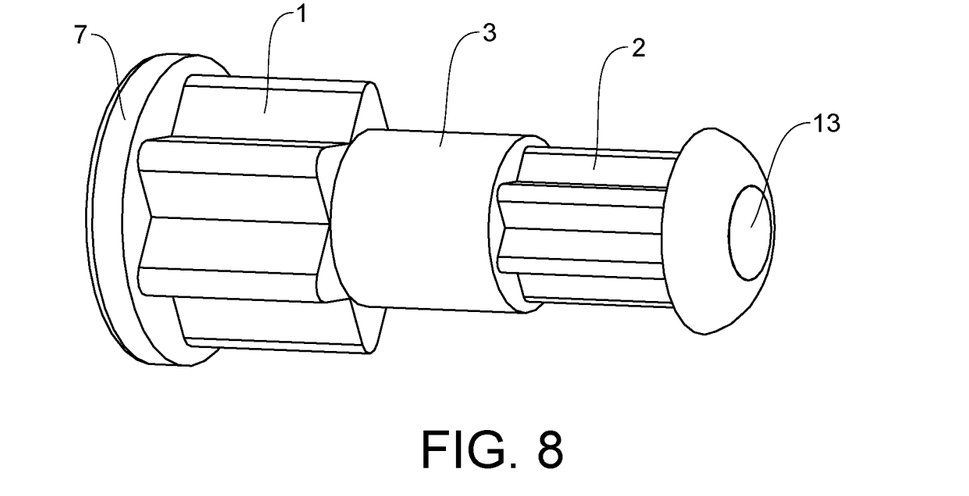
FIG. 8 is a perspective view of the coupling with integral end cap and rivet tail deformed.

Alternately, the fastener may be omitted and the coupling body modified by a projection whose end is intended to serve as a rivet tail 12 to be deformed 13 to encapsulate the assembly.

These fastening elements may replace the first portion integral end cap and thus be present on both the first portion proximal end and the second portion distal end and may be interchanged in any manner. These various coupling fastening elements when combined with the selection of coupling materials of manufacture result in a large number of possible configurations.

With regard to linear motion of peripheral assembly components along the longitudinal center axis of the coupling, the peripheral assembly parts adjacent to the second portion are constrained from moving towards the center of the coupling by virtue of the coupling center portion having a diameter which exceeds the diameter of the circle circumscribing the second portion polygon shape. The assembly components placed adjacent to the center portion of the coupling are constrained from moving outward of the center portion area by coming into contact with those assembly parts that are placed adjacent to the second portion on one side and by virtue of the first portion shape circumscribing a circle that is greater than or equal to the center portion on the other.

Finally, those last peripheral component parts which are the most distant from the center assembly parts are constrained by either an end cap integrally joined to the coupling body or one of several fastening elements that vary with the coupling embodiment.

The coupling may be formed from a substantially rigid material capable of being formed into the shape and configuration disclosed in the FIGS. 1-8. Materials for the coupling manufacture are discussed relative to the particular implementation and are presented as nonlimiting examples.

The coupling utility will be better understood and features more apparent by the following description of representative employments and the accompanying drawings.

Three Employments of the coupling, A, B and C, are presented and their specific characteristics disclosed as representative of the many possible embodiments and uses-all having the improvement characteristics of the invention. These three representative examples of coupling employment are illustrated in FIGS. 9-15; portions depicted outside the phantom linetype boxes are not claimed.

Figure 9:
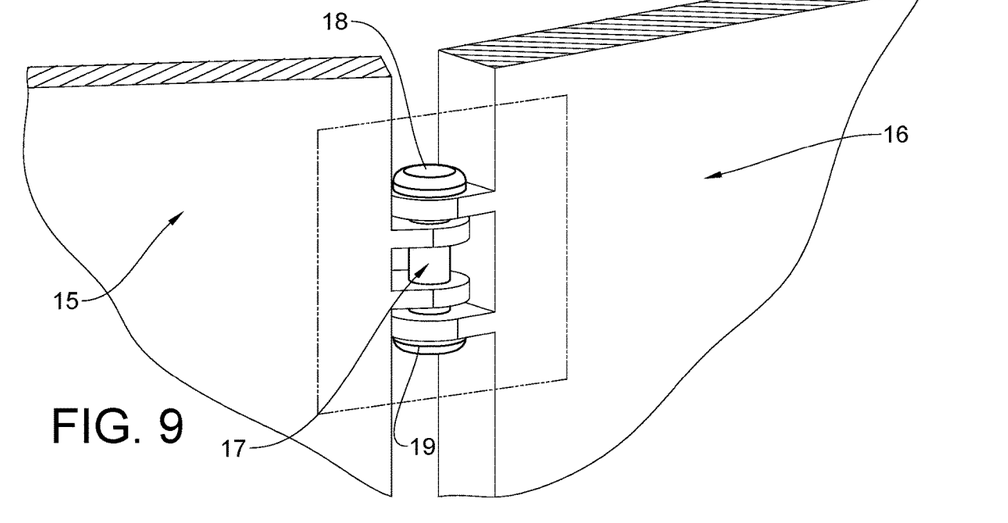
FIG. 9 is a perspective view of Employment A of the invention.
Figure 10:
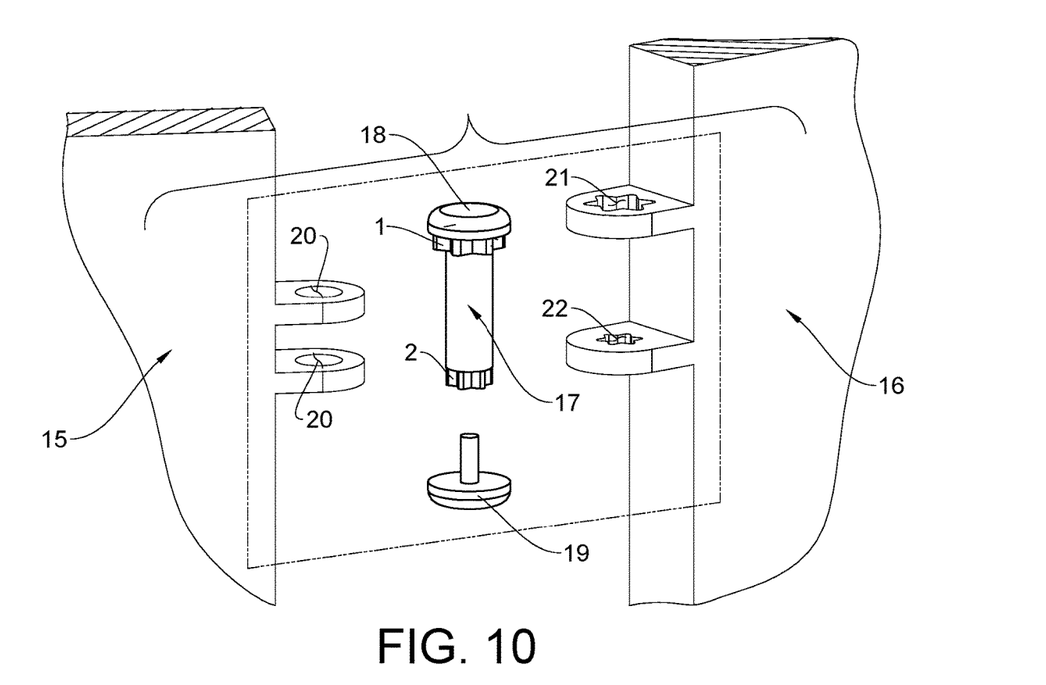
FIG. 10 is an exploded view of Employment A of the invention with detached chemically bonded fastener.

Please see FIGS. 9 and 10 for Employment A discussion.

Coupling Employment A is an application as would be present in, but one example, hinging plastic covers 15 to plastic enclosures such as cabinets 16. The coupling is shown in a vertical orientation with end cap up.

The coupling 17 of Employment A has the coupling body characteristics and constraints presented above. The coupling of this embodiment has a fixed cap end 18 formed with the coupling body on the proximal end of the first portion 1.

In this embodiment, a recess (not shown) centered on the center axis of the coupling is placed at the distal end of the second end portion for purposes of receiving a fastener. The fastener may be but is not limited to metal drive rivets which expand to friction fit the recess when the mandrel of the drive rivet is impacted or, alternately, capped fasteners of plastic or metal material may be chemically bonded to the body of the coupling. In this example of an embodiment, the latter in plastic form is presented 19.

The body of the coupling itself can be manufactured by casting relatively low yield strength and tensile strength steel including but not limited to grade two and five. Alternately, for applications where larger coupling diameters are permitted, the entire coupling can be manufactured of higher strength plastics including but not limited to fiber reinforced plastics, PPS (polyphenylene) or polyamideimide (PAI) using single shot or other molding techniques. Regardless of the selected material, the general proportional and shape constraints between portions of the coupling apply.

The peripheral assembly components 15, 16 (shown only partially) can be made of a variety of materials and would only require that the component intended to rotate have a circular opening 20 for insertion of the coupling and the components intended to be fixed have openings 21, 22 whose shape is the negative of the first 1 and second 2 coupling portion in that order. These peripheral assembly component openings adjacent to the center, first and second portions may be formed by a method related to their manufacture. For this example, an assembly component made of injection molded plastic, the opening would be formed by the part mold. The coupling would be placed after all assembly components are fabricated and aligned and, lastly, the fastener chemically bonded to the coupling.

Figure 11:
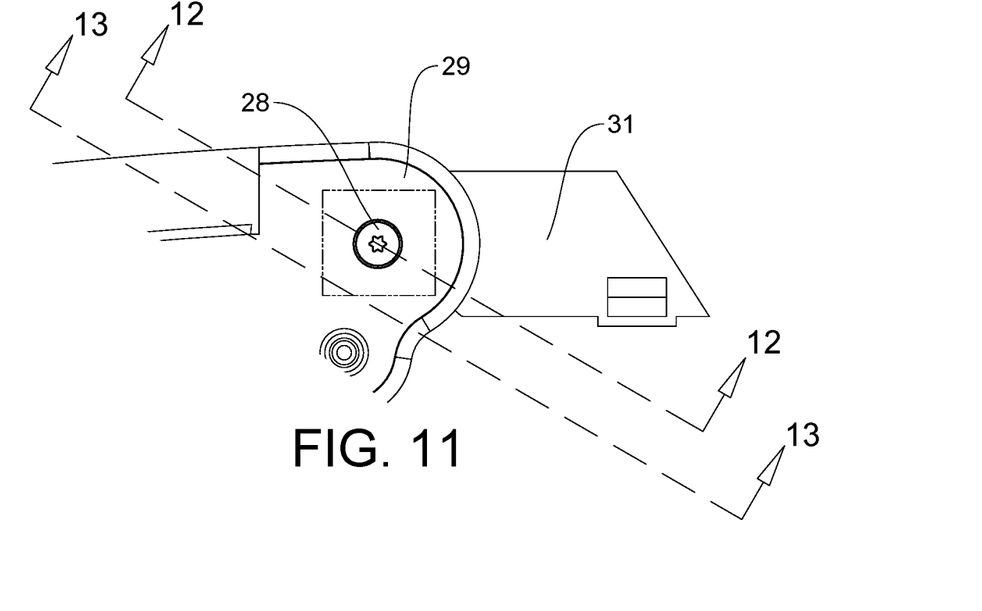
FIG. 11 is an orthographic plan view of Employment B of the invention.
Figure 12:
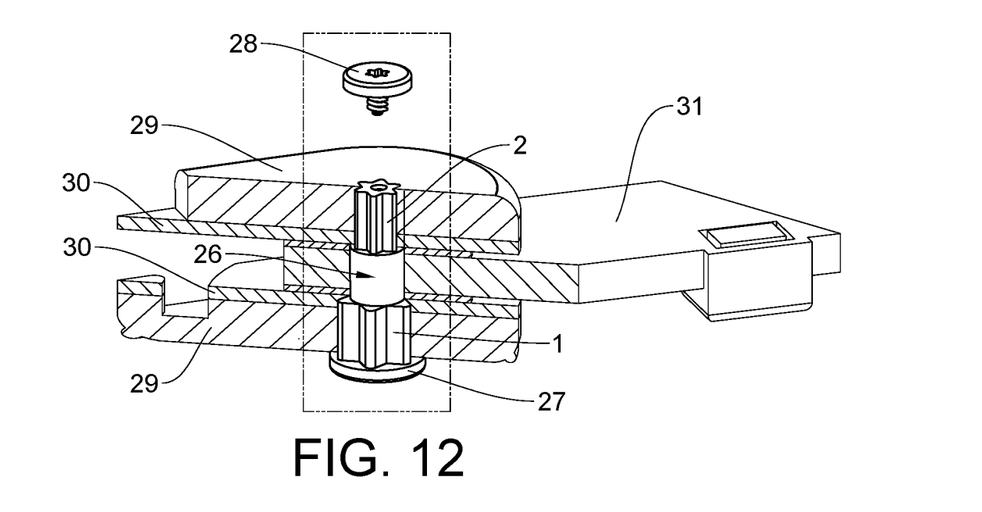
FIG. 12 is a perspective section view of Employment B of the invention. (Coupling not sectioned.)
Figure 13:
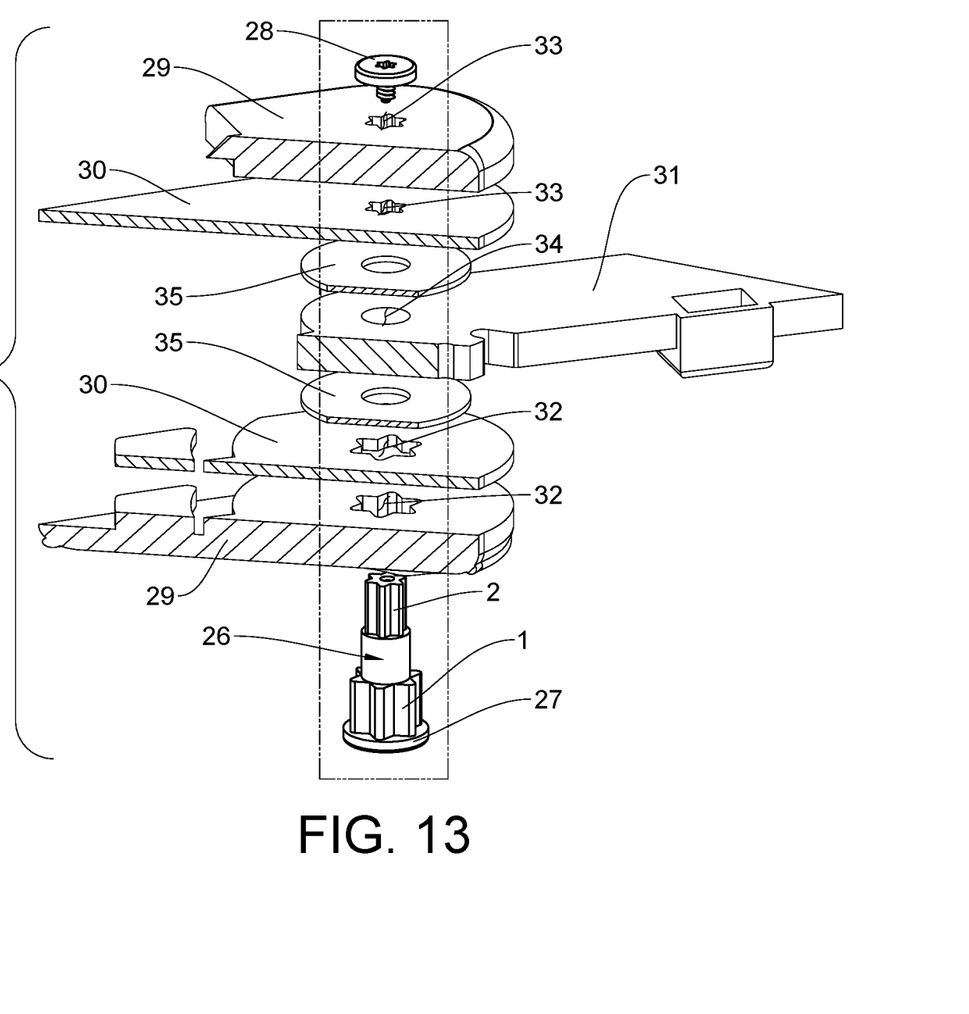
FIG. 13 is an exploded perspective section view of Employment B of the invention with detached threaded fastener. (Coupling not sectioned.)

Please see FIGS. 11-13 for a discussion of coupling Employment B.

The coupling of Employment B is intended for, again in but one example, applications that require higher duty cycles such as would be present in a retractable utility knife. The design shape and proportions of the center, first and second portion sections of the coupling body are as previously described. The coupling is presented in a vertical orientation with end cap down and knife components are only partially depicted. In FIGS. 12 and 13, the coupling itself is not sectioned.

The coupling 26 of this employment has a fixed capped end 27 formed with the coupling body on the proximal end of the first portion 1. The distal end of the second portion 2 has a threaded nut fastener 28 to encapsulate the assembly. In this arrangement, the assembly components including the multiple knife body layers 29, 30 and blade holder 31 components can be serially placed and fastened by inserting the coupling at one end greatly simplifying manufacture of the knife assembly.

The body of the coupling itself can be manufactured by casting or machining metal with higher yield strength and tensile strength steel such as grade eight steel or eighteen-eight stainless steel as non-limiting examples. As in Employment A, the coupling of Employment B can also be manufactured of higher strength plastics using methods previously given.

The peripheral assembly for the body of the knife components not intended to move can be various layers of molded plastic 29 and stamped metal 30, fabricated independently which when joined together would provide grip shape, flexural strength can be adapted to placing control buttons. The assembly components would have either the requisite larger openings 32 whose shape is the negative of the adjacent coupling first portion 1 or the smaller openings 33 whose shape is the negative of the adjacent coupling second portion 2. The blade holder 31, on the other hand, would be required to rotate and therefore be placed on the center of the coupling and have a circular opening 34 to fit the center portion of the coupling. Friction fit washers 35 are optionally placed to provide the desired resistance to rotation to the blade holder. The particular aspects of these various knife assembly parts are not relevant this application except as regards the shape and size of the required openings 32, 33 and 34. The coupling constrains components linearly and rotationally except for allowing the blade holder 31 to rotate about the center axis as needed.

Figure 14:
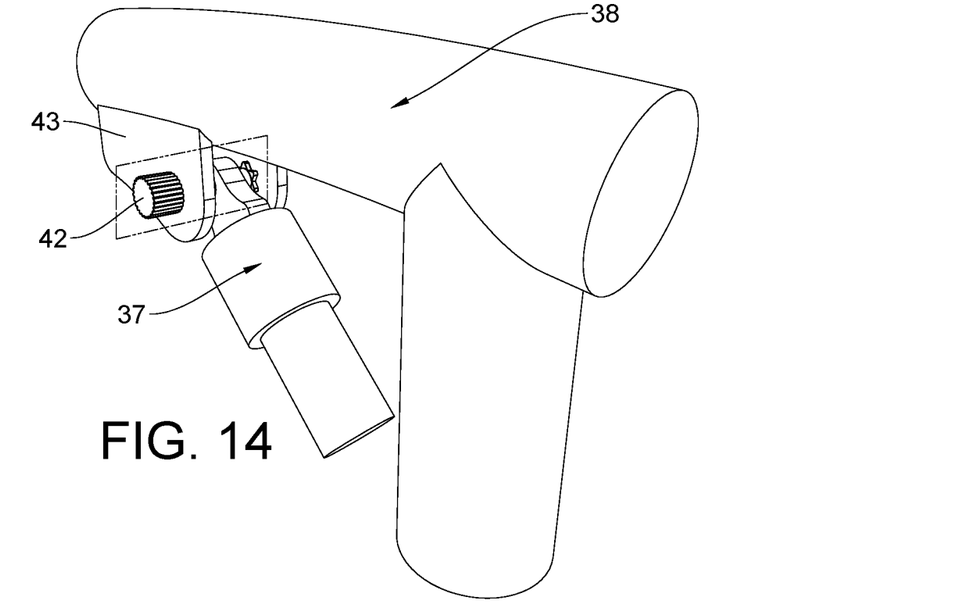
FIG. 14 is a perspective view of Employment C of the invention.
Figure 15:
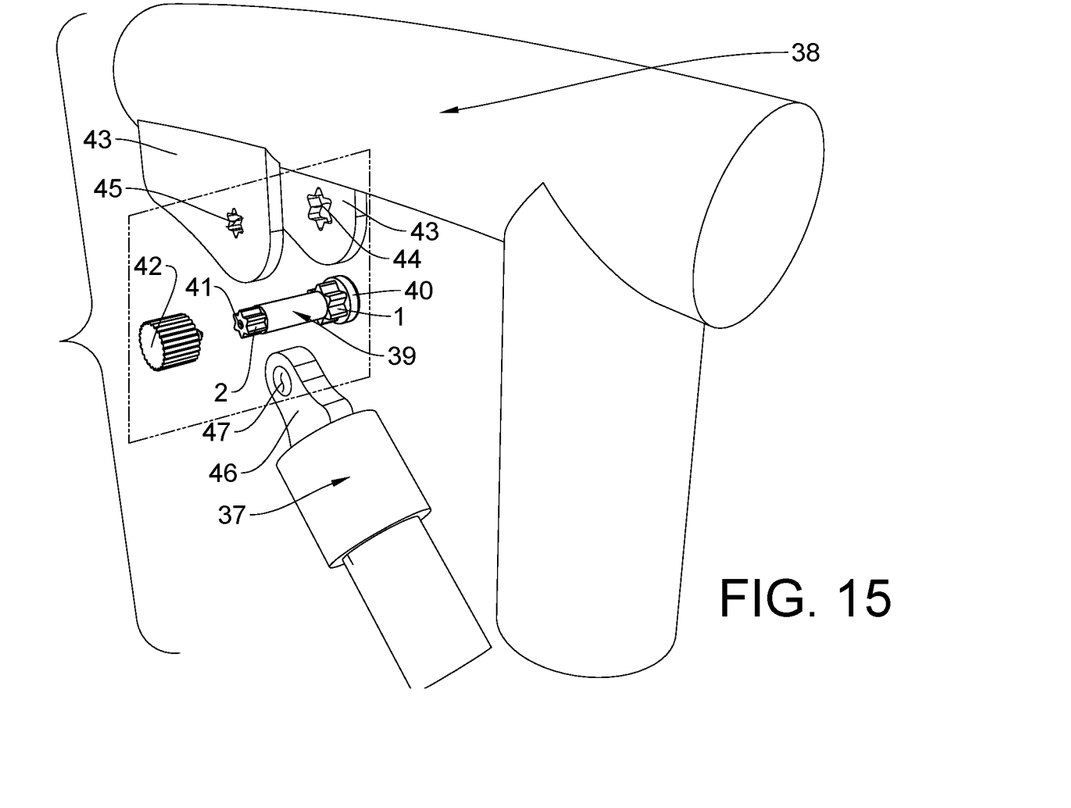
FIG. 15 is an exploded perspective view of Employment C of the invention with detached threaded fastener.

Please see FIGS. 14-15 for a discussion of Employment C.

Employment C example is presented as a coupling used to attach a shock absorber 37 to the carbon fiber frame 38 of an offroad bicycle—an application requiring greater strength and the capability for replacement of the shock absorber. The design shape and relative proportions of the center, first and second portion section shapes of the coupling are as previously described.

The coupling of this embodiment 39 has a fixed end cap 40 formed with the coupling body on the proximal end of the first portion 1. The distal end of the second portion has a threaded recess 41 to receive an externally threaded fastening nut 42—shown with knurled edges- and thereby contain the assembly.

In this embodiment, the shock absorber can be placed in its frame location, the coupling inserted from one end and the externally threaded nut placed to secure the assembly. In this instance, the nut can be removed and the assembly disassembled for maintenance or replacement of the shock absorber.

The peripheral assembly components in this instance are carbon fiber composite frame sections—generally flat triangular fins 43 formed with the tubular frame. The composite fins would be cast with the requisite openings 44, 45 shaped as the negative of the first 1 and second 2 portion of the coupling in that order. The shock absorber would have attachment flange 46 projecting from the body of the top piece with a circular opening 47 to receive the center portion of the coupling. Only portions of the bicycle frame and shock are presented as they are not part of this of this application beyond the requirement for openings 44, 45 and 47 as shown.

In these three employments the coupling would not rotate thus facilitating linear constraint of assembly components along the longitudinal center axis while allowing those intended—the shock absorber—to pivot around the center axis to do so. In instances such as Employment C, this linear constraint would also produce opposing moment forces parallel to the coupling axis which would strengthen and stiffen the assembly. In this embodiment, the carbon fiber fins would be less prone to fracture or other failures at the point where these fins meet the carbon fiber frame.

In all embodiments given as examples, the physical characteristics of the coupling assembly invention including specific geometric properties and modes of fastening are disclosed and improvements provided by the invention presented.

While not generally suited to large volume production, 3D printing techniques including but not limited to Selective Laser Sintering to produce polymer based components or Direct Metal Laser Sintering to produce metal components can be used to produce coupling embodiments for specialized applications such as medical appliances as a non-limiting example.

What is claimed is:

1. A coupling for conjoining assembly components and controlling the motion of said components comprising:
    a first end portion and an axially aligned opposite second end portion both shaped to resist rotational motion of assembly components placed adjacent to these portions about the longitudinal center axis of the coupling and a center portion interposed between and connected to both the first end portion and opposite second end portion shaped to permit rotational motion of assembly components placed adjacent to the center portion about the longitudinal center axis of the coupling;
    the center portion shaped so that its section normal to the longitudinal center axis of the coupling describes a circle and interfaces with and is operably coupled to components adjacent to the center portion about the longitudinal center axis and possessing openings which are the negative of the center portion of the coupling;
    the first end portion shaped so that its section normal to the longitudinal center axis describes a complex concave polygon circumscribed around a circle whose diameter is greater than the circle of the center portion and interfaces with and is operably coupled to components adjacent to the first portion about the longitudinal center axis and possessing openings which are the negative of the first portion of the coupling;
    the second end portion shaped so that its section normal to the longitudinal center axis describes a complex concave polygon inscribed in a circle whose diameter is less than the circle of the center portion interfacing with and operably coupled to components adjacent to the second portion about the longitudinal center axis and possessing openings which are the negative of the second portion of the coupling;
    a third portion formed as a distal edge of the first end portion, characterized by a section plane normal to the center axis at a distal end of the first portion adjacent to the center portion, is formed to resist linear motion along the longitudinal center axis of assembly components placed adjacent to the center portion about the longitudinal center axis and possessing openings which are the negative of the center portion of the coupling; and
    a fourth portion formed as a distal edge of the center portion, characterized by a section plane normal to the center axis at a distal end of the center portion adjacent to the second portion, is formed to resist linear motion along the longitudinal center axis of assembly components placed adjacent to the second portion about the longitudinal center axis and possessing openings which are the negative of the second portion of the coupling.

2. The coupling of claim 1 wherein a generally cylindrical element is formed with the coupling as a unitary structure at a proximal end of the first portion and shaped so that said element's section normal to the longitudinal center axis describes a circle whose diameter is greater than the circle which circumscribes the first portion.

3. The coupling of claim 1 wherein a recess in a proximal end of the first end portion and/or a distal end of the second end portion is formed for purposes of receiving a friction fit or bonded fastener.

4. The coupling of claim 1 further comprising a friction fit or bonded fastener for attachment at a proximal end of the first portion and/or a distal end of the second portion.

5. The coupling of claim 1 wherein an optionally internally threaded recess at a proximal end of the first end portion and/or a distal end of the second end portion is formed for purposes of receiving an externally threaded fastener.

6. The coupling of claim 1 further comprising an externally threaded fastener for attachment at a proximal end of the first portion and/or a distal end of the second portion.

7. The coupling of claim 1 further comprising a generally cylindrical element formed with the first end portion and/or the second end portion for purposes of serving as a rivet tail and being deformed.

* * * * *